United States Patent
Parm et al.

(10) Patent No.: US 9,226,003 B2
(45) Date of Patent: Dec. 29, 2015

(54) METHOD FOR TRANSMITTING VIDEO SIGNALS FROM AN APPLICATION ON A SERVER OVER AN IP NETWORK TO A CLIENT DEVICE

(75) Inventors: Lauri Parm, Tallinn (EE); Jaanus Kivistik, Tallinn (EE)

(73) Assignee: Streamtainment Systems OÜ, Tallinn (EE)

( * ) Notice: Subject to any disclaimer, the term of this patent is extended or adjusted under 35 U.S.C. 154(b) by 115 days.

(21) Appl. No.: 14/241,123

(22) PCT Filed: Aug. 27, 2012

(86) PCT No.: PCT/EP2012/066628
§ 371 (c)(1),
(2), (4) Date: Feb. 26, 2014

(87) PCT Pub. No.: WO2013/030166
PCT Pub. Date: Mar. 7, 2013

(65) Prior Publication Data
US 2014/0196102 A1      Jul. 10, 2014

(30) Foreign Application Priority Data
Aug. 26, 2011   (EP) .................................... 11006978

(51) Int. Cl.
*H04N 21/234* (2011.01)
*H04N 21/2662* (2011.01)
(Continued)

(52) U.S. Cl.
CPC ... *H04N 21/23406* (2013.01); *H04N 21/23418* (2013.01); *H04N 21/2662* (2013.01);
(Continued)

(58) Field of Classification Search
CPC ............ H04N 21/20; H04N 21/23406; H04N 21/23418
See application file for complete search history.

(56) References Cited

U.S. PATENT DOCUMENTS

| 4,823,108 A | 4/1989 | Pope |
| 5,241,625 A | 8/1993 | Epard et al. |

(Continued)

FOREIGN PATENT DOCUMENTS

| EP | 2237526 A1 | 10/2010 |
| EP | 2244182 A2 | 10/2010 |

(Continued)

OTHER PUBLICATIONS

EP Search Report dated Feb. 22, 2012 of EP11006978.8.
(Continued)

*Primary Examiner* — Kyu Chae
(74) *Attorney, Agent, or Firm* — Maine Cernota & Rardin

(57) ABSTRACT

A method for transmitting a video signal from an application running on a server over an IP network to a client device. The application is drawing its content, in a plurality of sequential drawing events, into a virtual frame buffer. Simultaneously, each drawing event is registered in a list of drawing events and each drawing event is associated with an address (location) of each area that was affected by this drawing event. The list is repetitively checked and if any area have changed since previous periodic check, such area is retrieved, segmented into blocks of standardized size and transmitted, together with its address in a frame, over the IP network to the client. On the client side the encoded blocks are received and combined, using the address data, into frames of an encoded video stream that can be directly fed into an industry standard decoder of client device.

20 Claims, 7 Drawing Sheets

(51) Int. Cl.
*H04N 21/61* (2011.01)
*H04N 21/6377* (2011.01)
*H04N 21/44* (2011.01)
*H04N 21/81* (2011.01)

(52) U.S. Cl.
CPC ..... *H04N21/44004* (2013.01); *H04N 21/6125* (2013.01); *H04N 21/6377* (2013.01); *H04N 21/8173* (2013.01)

(56) References Cited

U.S. PATENT DOCUMENTS

| | | | |
|---|---|---|---|
| 5,796,566 | A | 8/1998 | Sharma et al. |
| 7,649,937 | B2 | 1/2010 | Rabenold et al. |
| 7,882,172 | B2 | 2/2011 | Kodaka et al. |
| 2003/0093568 | A1 | 5/2003 | Deshpande |
| 2004/0010622 | A1 | 1/2004 | O'Neill |
| 2006/0020710 | A1 | 1/2006 | Rabenold |
| 2007/0047657 | A1 | 3/2007 | Toma |
| 2007/0268824 | A1 | 11/2007 | Kodaka |
| 2009/0080523 | A1 | 3/2009 | McDowell |
| 2011/0052090 | A1 | 3/2011 | Nonaka |
| 2011/0148891 | A1* | 6/2011 | Paquette et al. ............... 345/531 |
| 2011/0206110 | A1 | 8/2011 | Bivolarsky |
| 2013/0159393 | A1* | 6/2013 | Imai et al. .................... 709/203 |

FOREIGN PATENT DOCUMENTS

| | | |
|---|---|---|
| EP | 2244183 A2 | 10/2010 |
| GB | 2318956 A | 5/1998 |
| JP | 2005027193 A | 1/2005 |
| KR | 20040038388 A | 5/2004 |
| WO | 0065464 A1 | 11/2000 |
| WO | 2006074110 A2 | 7/2006 |

OTHER PUBLICATIONS

PCT Search Report dated Feb. 15, 2013 of PCT/EP2012/066628.

* cited by examiner

US 9,226,003 B2

METHOD FOR TRANSMITTING VIDEO SIGNALS FROM AN APPLICATION ON A SERVER OVER AN IP NETWORK TO A CLIENT DEVICE

RELATED APPLICATIONS

This application is a national phase application filed under 35 USC §371 of PCT Application No. PCT/EP2012/066628 with an International filing date of Aug. 27, 2012, which claims priority to European Patent Application No. 11006978.8, filed Aug. 26, 2011. Each of these applications is herein incorporated by reference in their entirety for all purposes.

TECHNICAL FIELD

This invention belongs into the field on telecommunications, particularly to systems and methods of transmitting video signals from an application on a server over an IP network to a client device, e.g., internet protocol TV (IPTV) device, mobile device, or PC, for providing services combined with advanced interactive applications such as voice or video calling, video gaming, video surveillance, video on demand (VOD), etc.

BACKGROUND ART

Current operating systems typically include a graphical drawing interface layer that is accessed by applications in order to render drawings on a display, such as a monitor. The graphical drawing interface layer provides applications an application programming interface (API) for drawings and converts drawing requests by such applications into a set of drawing commands that it then provides to a video adapter driver. The video adapter driver, in turn, receives the drawing commands, translates them into video adapter specific drawing primitives and forwards them to a video adapter (e.g., graphics card, integrated video chipset, etc.). The video adapter receives the drawing primitives and immediately processes them, or alternatively, stores them in a First In First Out (FIFO) buffer for sequential execution, to update a framebuffer in the video adapter that is used to generate and transmit a video signal to a coupled external display.

Client-server based solutions are becoming more and more widespread. In such solutions, the client has relatively limited to very limited resources, e.g., in terms of limited processing power, limited memory resources, or limited power supply. Also, the communication channel between server and client device almost always tends to be limited, having limited bandwidth, or high latency.

Client-server based solutions include remote desktop management, thin client applications, but also applications streaming video signal into a client device such as smart phone or, for example, client devices such as settop box (STB), including for Internet TV or Internet Protocol TV (IPTV). Such applications include TV programming, VOD, video games, video communication solutions, video surveillance solutions, etc.

While mainframe—terminal solutions have been around since the very beginning of computers, dedicated lines were used to connect mainframe to the monitor. Today the challenge is that for video signal, often an Internet Protocol (IP) based connection channel is used to connect server and client. Applications are hosted on remote servers (or virtual machines running thereon) in a data centre. A thin client application installed on a user's terminal connects to a remote desktop server that transmits a graphical user interface (GUI) of an operating system session for rendering on the display of the user's terminal. One example of such a remote desktop server system is Virtual Computing Network (VNC) which utilizes the Remote Framebuffer (RFB) protocol to transmit framebuffers (which contain the values for every pixel to be displayed on a screen) from the remote desktop server to the client. While from the client device requirements viewpoint, the goal is that all the image processing is performed on a server side, it would result in extremely large amounts of raw data to be transmitted from server to client device (e.g., for an image resolution of 1920×1200 and color depth of 24 bits per pixel at a rate of 60 times per second would require transmitting 3.09 Gb/s (gigabits per second). One approach is to use spatial compression, i.e., each frame is compressed using lossless or lossy encoding, such as Discrete Cosine Transform (DCT).

Additionally, only those parts of the frame that have changed compared to previous frame should be transmitted from the server to the client. For that purpose, the frame is divided into subparts and on server side, each subpart is compared with the subpart of a previous frame. For example, current frame is saved in a primary buffer and a previous frame is saved in a secondary buffer. Solutions exist were only those areas (blocks) are updated from primary buffer to a secondary buffer that have changed.

Both spatial and temporal compression is required in the server side, resulting in need on the client side to easily decode the signal without overburdening the client device.

Encoding and decoding are widely used in video transmission. MPEG2 and MPEG 4 (H.264) are industry standards and widely used. Video signal is first encoded, using both spatial and temporal compression. Spatial compression is performed within a frame similarly to compression used for JPEG and is based on DCT, that describes a set of pixels by a set of superimposed cosine waveforms. DCT is applied to 8×8 pixel blocks. Additionally, temporal compression is used. MPEG2 uses 3 types of frames I, B, P, I frame is fully encoded frame. P is predicted frame, based on I frame. P can be decoded only after previous I frame is decoded. B is bi-directionally predicted frame, based on both I and P frame. Further, in addition that there are 3 types of frames, each type of frame comprises blocks that can be I, B or P type. I frames contain only I type blocks, P frames contain I or P type blocks and B type frames contain I, B or P type blocks. Additionally, each macroblock (16×16 pixels) can introduce a motion vector, useful, e.g., for camera panning. Most client devices, such as settop boxes, smart or mobile phones, thin clients, etc., usually include MPEG2 and/or MPEG4 decoder.

Known is U.S. Pat. No. 7,649,937 (published as US2006/0020710), disclosing a method of to deliver real-time video data over the Internet. A streaming processor receives raw video data from a video source; the video data is compressed by grouping pixels into blocks and comparing blocks of adjacent (i.e., consecutive in time) frames of video data to identify any changes. Only blocks that have been changed are transmitted. In addition, if a block has changed to a previously transmitted block, then only an identification index for the block is transmitted. The actual content of the block can then be recreated by comparing the index to a list of previously received blocks. This method requires storing on a server at least two adjacent (consecutive) frames and comparing such frames pixel by pixel, or block by block to identify any changes.

Known is GB2318956, disclosing a display screen duplication system and method for maintaining duplicate copies of all or a portion of a display screen at two or more computer systems. The display screens are segmented into a two-dimensional matrix of blocks. A value, e.g., CRC, is computed for each of the blocks and stored with a pointer to the corresponding block of the display screen. Changes in the display screen are detected by repeatedly calculating the values and comparing with previously stored values for the corresponding block. When the values are different, the pointers are temporarily stored until a predetermined period of time or all the blocks have been checked. When at least one of these criteria is met, adjacent blocks are transmitted as a group, preferably using compression. This method requires repeatedly comparing consecutive display screens block by block.

Known is U.S. Pat. No. 4,823,108, describing a method for displaying information in overlapping windows on a video display of a computer controlled video display system independent of the operating system of the computer. The computer program output display data can be written within windows on the video display without substantial modification of the application program by writing such data to a pseudo screen buffer for temporary storage. The contents of the pseudo screen buffer are then compared with the contents of a previous image buffer at selected, timer-controlled intervals. At memory locations where the data differs, the differing data are written into the previous image buffer. As display data is thereby identified and periodically updated, it is displayed in selected windows. This method requires comparing consecutive image buffers and updating the image buffer accordingly.

Known is WO00/65464, disclosing a system and method for controlling information displayed on a first processor-based system, from a second processor-based system. The apparatus comprises a memory to store instruction sequences by which the second processor-based system is processed, and a processor coupled to the memory. The stored instruction sequences cause the processor to: (a) examine, at a predetermined interval, a location of a currently displayed image; (b) compare the location with a corresponding location of a previously displayed image to determine if the previously displayed image has changed; (c) transmitting location information representing the change; and (d) storing the changed information on the first processor-based system. Specifically the CPU keeps a record of the location of the most recent changes, and examines those locations more frequently. This technique is based on the assumption that a change will very likely occur close the location of a most recent change involving an input/output device activity.

Known is U.S. Pat. No. 5,241,625, disclosing a system for remotely controlling information displayed on a computer screen by intercepting output events such as graphics calls. Graphics commands which drive a computer window system are captured and saved as a stored record or sent to other computers. A message translation program translates the captured messages for playback on a designated computer.

Known is U.S. Pat. No. 5,796,566, disclosing a system in which sequences of video screens forwarded from a host CPU to a video controller, are stored and subsequently retrieved by a terminal located remote from the host CPU. In particular, display data is captured in a local frame buffer which stores the display data frame by frame. A previous frame or screen of display data is compared with a current frame or screen of display data to determine if a change has occurred.

Known is U.S. Pat. No. 7,882,172 (published as US2007/268824), disclosing a thin client system for a high-quality picture reproduction method for using a thin client terminal as TV phone terminal and a TV conference terminal. The method (FIG. 4 of the patent) comprises on a screen data transmission side: initializing the screen block table e.g. by setting each block data of the table to a default value; if an update is detected in the screen information, control enters a loop to transmit the differential data to the remote controller, comprising sequentially reading screen information from the VRAM from the upper-left block to the lower-right block; in the first screen monitor loop, obtaining screen block data corresponding to the block number designated by the VRAM; next, comparing the screen block data with data of the associated block number stored in the screen block table; if the data matches with the data stored in the table, it is determined that the screen has not been updated. Control returns to processing to acquire next block data; if it is determined as a result of data comparison that the data does not match each other, it is recognized that the screen has been updated and the obtained screen block data is stored as the value of the associated block number; the screen block data is compressed; the compressed block data is sent together with the block number to the remote controller; the sequence of processing steps are repeatedly executed at a predetermined interval of time; on a screen data reception processing side, the screen block data is received and is written into VRAM-CL to thereby display an updated screen on the display of the terminal; first, the block number and the screen block data are received; the screen block data compressed as above is expanded or decompressed; the decompressed data is written in an associated area of the VRAM-CL corresponding to the block number. As a result, the contents of the screen update are presented on the display; finally, the sequence of processing steps are repeatedly executed until the process is terminated. It is possible that only the blocks in which a change takes place in the screen is efficiently transmitted.

This may be considered the closest known solution. However, according to this method, the received blocks are first expanded or decompressed and then stored in a VRAM-CL. Such method cannot be used or has no advantages if the thin client device is equipped with industry standard video decoder such as MPEG2 or H.264.

DISCLOSURE OF INVENTION

What is needed is better and more efficient method of transmitting video signals over an IP network to a client device with limited resources as to processing power, memory, or power resources, such as an IPTV device or mobile devices such as smart phone. The goal of the invention is to further reduce the amount of data to be transferred over the IP network from a server to a client device. Another goal is to provide low latency transmission over the IP network from a server to a client device. Further goal of the invention is that the invented method does not require additional processing power on the client device. Further goal of the invention is to provide a method that can make use of an industry standard decoding method on the client side even though the video signal transmitted over the IP network is not that industry standard signal. Another goal of the invention is a method that can be used for applications, requiring receiving by the server video signals also from the client side, i.e., video conferencing, video gaming, etc.

These and other goals of the invention are achieved by a method for transmitting a video signal over an IP network form a first application running on a server to a client device, said first application generating a video output that is intended to be shown as images on a display device as follows. The first application is drawing its content into a virtual frame buffer in a plurality of consecutive drawing events. A drawing event being any output command generated by the application intended to change the image on the display device by changing the content of the frame buffer, regardless of any specific hardware, software, libraries, or software layers used. The content represents images to be shown, each such image comprising of a plurality of pixels, the virtual frame buffer thus at each moment of time comprising the freshest complete image. Simultaneously, each drawing event is entered into a list of drawing events. Each drawing event is associated in the list of drawing events with data defining the area (or areas) of the image that was (were) affected by the corresponding drawing event. These steps are repeated as long as the first application is running.

Then, repetitively, at discrete time intervals, it is determined directly from the list of drawing events, which area (or areas) of the image have been changed by any drawing events since previous determination one discrete time interval earlier. Such area (or areas) of image is (are) segmented into one or more blocks of pixels, said blocks having predetermined size. Such blocks are stored, together with their identification data, in an output buffer of blocks of predetermined size. More than one subsequent in time blocks may be stored in the output buffer so that temporal compressing methods can be used. Then, periodically, at periodic time intervals, said blocks stored in an output buffer are encoded together with their identification data and said encoded blocks are transmitted over the IP network to the client device.

According to one preferred embodiment, the method further comprises a step of optimizing the list of drawing events by removing events that have changed any area that is also changed by a later event in the list, by scanning the list for events that have changed areas that partially overlap, and combining such overlapping areas into a set of non-overlapping rectangular areas, or both such steps.

According to one embodiment, the lengths of said discrete time intervals are adjusted depending on the frequency of drawing events, i.e., depending on how often the drawing events occur. For example, shorter time interval may be preferred when the drawing events occur more often, thereby keeping the list of drawing events shorter. According to one embodiment, said segmenting takes place immediately when the drawing event occurs. In other words, each of said discrete intervals is determined by and is equal to a time interval between two successive drawing events.

On the client side, the method comprises receiving said encoded blocks with their identification data; storing said encoded blocks in a buffer, according to their identification data; and periodically receiving and assembling said encoded blocks from said buffer, into encoded frames of an encoded video stream, suitable for being decoded by a decoder in said client device. Such encoded video stream can be directly fed to a decoder in said client device to be decoded and shown on a display of a client device. The decoder is preferably an industry standard video decoder, capable of decoding video streams in video standard format, such as MPEG2 or H.264 format. Also the block size may be determined by that decoding method. For example, for MPEG2 and H.264 the suitable block is 16 by 16 pixels (so called macroblock). It is important to appreciate, that while standard decoder can be used on the client side without any modifications, the signal on the server side is not coded according to this standard and no such coding device is needed on the server.

The periodic time interval for outputting encoded blocks in the server side may be determined by a nominal frame rate of said decoder in said client device. E.g., for a MPEG2 decoder with nominal frame rate 25 fps, the periodic time interval may be chosen 1 s/25 fps=40 ms. In a more preferred embodiment, said periodic time interval for outputting encoded blocks in the server side is further adjusted by feedback from the client side so that a decoder input buffer that is receiving said encoded video stream, comprises not more than a preset number of frames (preferably, from 1 to 100, more preferably from 2 to 6). Generally, the periodic time interval is chosen so that the periodic checks take place 24 to 60 times per second.

The method can be used also for video calling, for video conferencing, for video gaming and video surveillance, or other applications, where also receiving a video signal from the client side is necessary. In this case, the method comprises further steps of creating a virtual camera device on the server side, the first application making calls (i.e., requests) to the virtual camera device, intercepting said calls made by the first application to the virtual camera device, transmitting the intercepted calls over the IP network to a camera that is connected to or integrated with the client device over a computer hardware bus (such camera may be a USB device, or a camera integrated into a mobile device), transmitting encoded a video signal from the camera over the IP network to the server and forwarding the encoded said video signal through the virtual camera device to the first application.

The method may further comprise running a third application on the client device, wherein the third application is adapted to receive a video signal from the camera and to forward the encoded video stream over the IP network to a second application running in the server, wherein the second application is receiving and processing the video stream, wherein said processing includes encoding and transcoding, when necessary, thereby feeding the first application with the video stream obtained by the third application from the camera of the client device.

The client device—such as IPTV device, a set-top box, including non-IPTV set-top box, OTT set-top box, digital TV set-top box, cable TV box, etc; smart phone, pocket PC, tablet PC, a mobile phone, a PC, or an internet connected TV, such as Smart TV, or gaming console—is equipped with an input device for receiving control events, the method comprises forwarding the control events over the IP network to the first application running on a server, thereby allowing interaction between the client device and the first application. Such input device may be a remote control, a keyboard, a mouse, a motion sensing input device, or a touch sensor, etc.

The method may further comprise receiving control events from a separate (i.e., independent from said client device) control device, connected to said server over an IP network. Such control device could be a smart phone, a mobile phone, pocket PC, tablet PC, a mobile phone, or a PC, etc.

The method may further comprise receiving video signals from a separate (i.e., independent, i.e., not connected to and not integrated with said client device) web camera, connected to said server over an IP network. The web camera may comprise functionalities to be connected to IP network (an IP camera), or may be connected through an additional IP camera adapter.

In a preferred embodiment, the first application on a server side is run on a virtual machine. Many virtual machines may be created on said server, each virtual machine running an application for its own client.

The goal of the invention is also achieved by a method of transmitting a video signal from an application running on a server over an IP network to a client device. The application is drawing its content (its output images), as in a plurality of sequential drawing events, into a virtual frame buffer. Simultaneously, each drawing event is registered in a list of drawing events and each drawing event is associated with an address (location) in a frame (also, in a virtual frame buffer) of each block that was affected by this drawing event. The list of drawing events is periodically checked and if any of the blocks within frame have changed since previous periodic check, such block is retrieved from the virtual frame buffer and is transmitted, together with its address in a frame, over the IP network to the client.

On the client side, in the client device the blocks are received and are combined, using the address data, into frames of a video stream.

While uncompressed blocks may be transmitted in some cases, preferably, on the server side, the blocks are encoded, e.g., spatially compressed, using proprietary or industry standard compressing methods, e.g., DCT, before the blocks are transmitted.

On the client side, the received encoded blocks are stored into a virtual frame buffer, using their address data. The content of the virtual frame buffer is periodically retrieved as a frame of an encoded video stream. The encoded video stream is then inputted into a decoder and the decoded stream is then to the display of the client device. While proprietary coding and decoding can be used, in a preferred embodiment, the blocks are assembled into frames so that industry standard decoding method can be used by the client device. In particularly preferred embodiment, a decoding method already supported by the client device is used. For example, if the client device is an IPTV device or other set-top box), it typically already supports MPEG2 and/or H.264 video decoding. Then, the blocks are assembled so that the frames can be decoded using MPEG2 and/or H.264 video coding.

MODE(S) FOR CARRYING OUT THE INVENTION

Figure 1A:
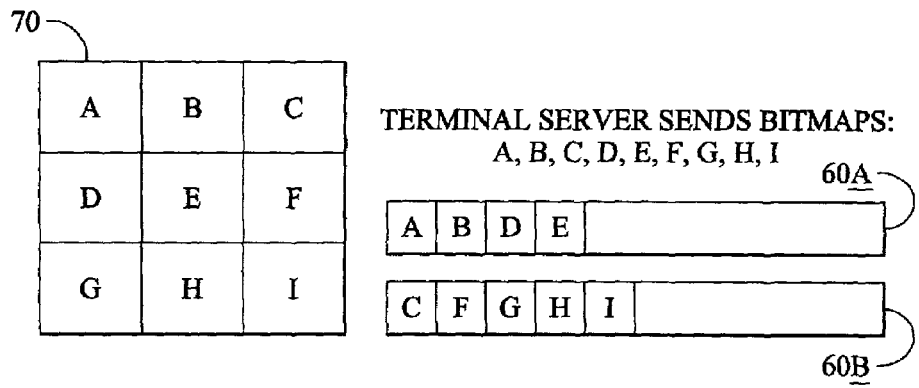
FIG. 1 is a method known from background art and FIG. 2 is another method known from background art.
Figure 1B:
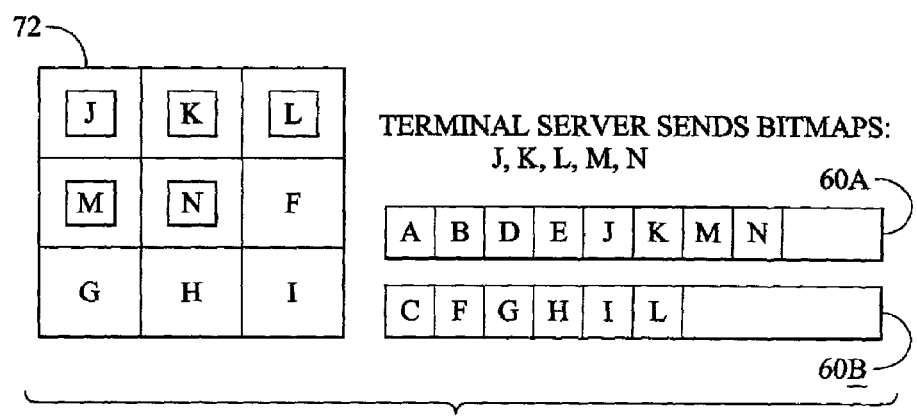
Figure 1C:
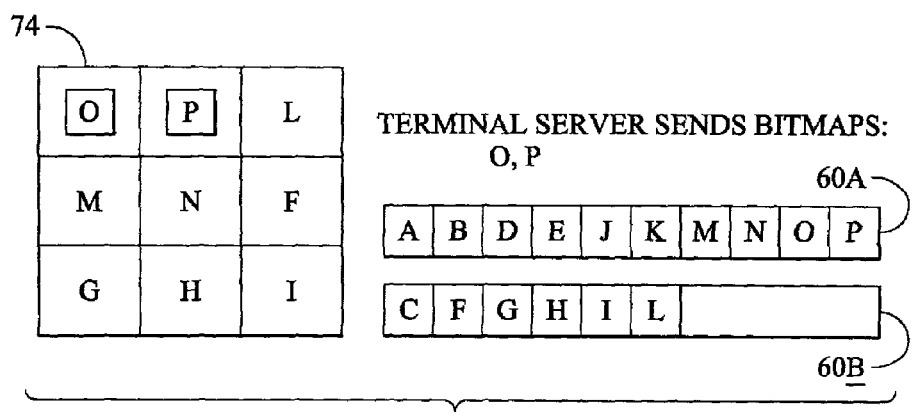

FIG. 1, A to C describes background art known from US20030093568, where frame 70 comprises nine blocks A to I, whereas blocks A, B, D, E have one size (e.g., 64 to 64) an DEFGHI have different size (e.g., 48 to 48 pixels). Those blocks are sent to the client device and cached. Now, when blocks change, the changed blocks 72 J, K, L, M and N only are transmitted to the client device and cached. Again, when blocks change, only changed blocks 74 O and P are transmitted. Then, the frame is rebuilt from cached blocks and displayed.

Figure 2:
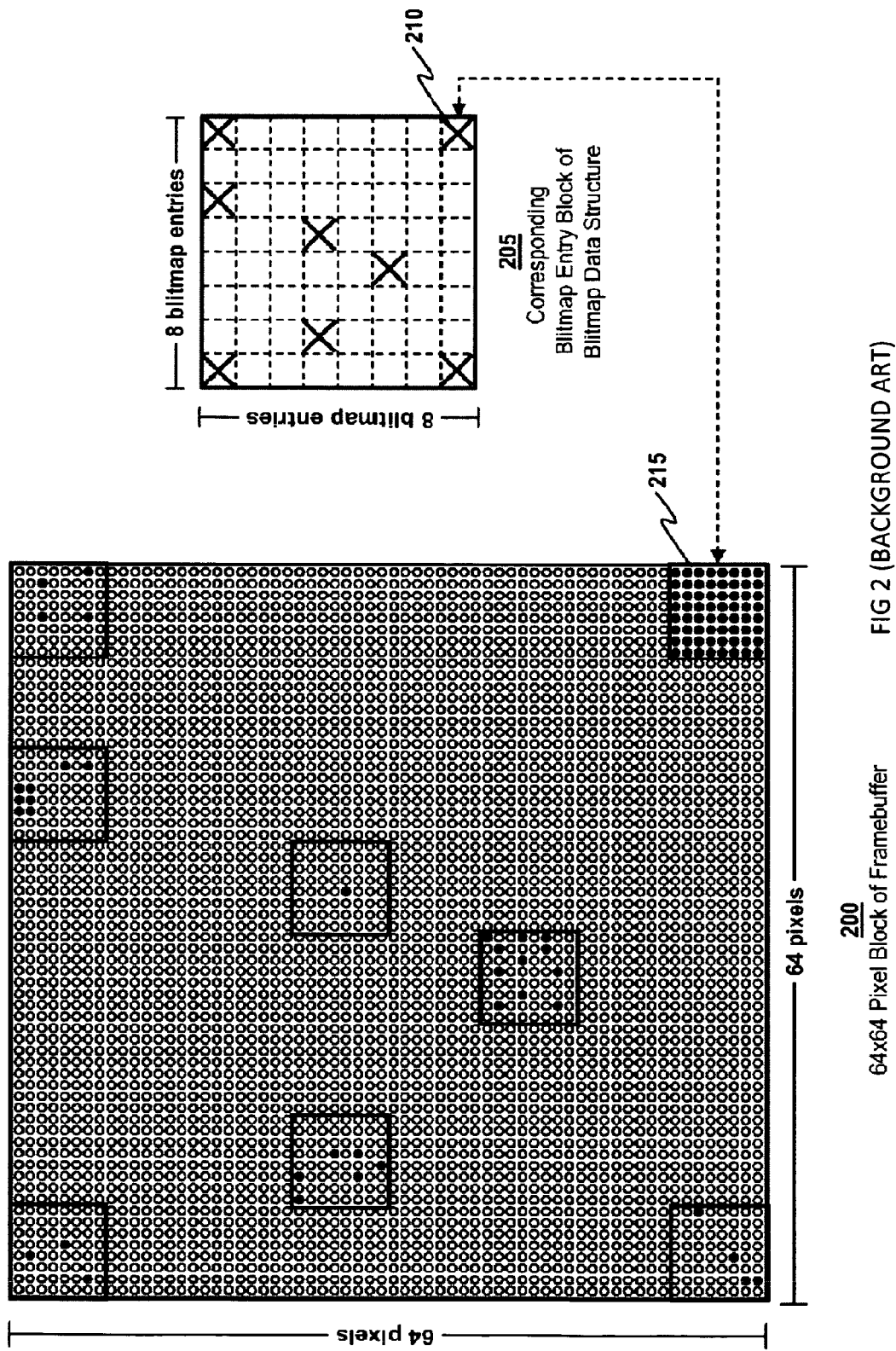
Figures 3, 4:
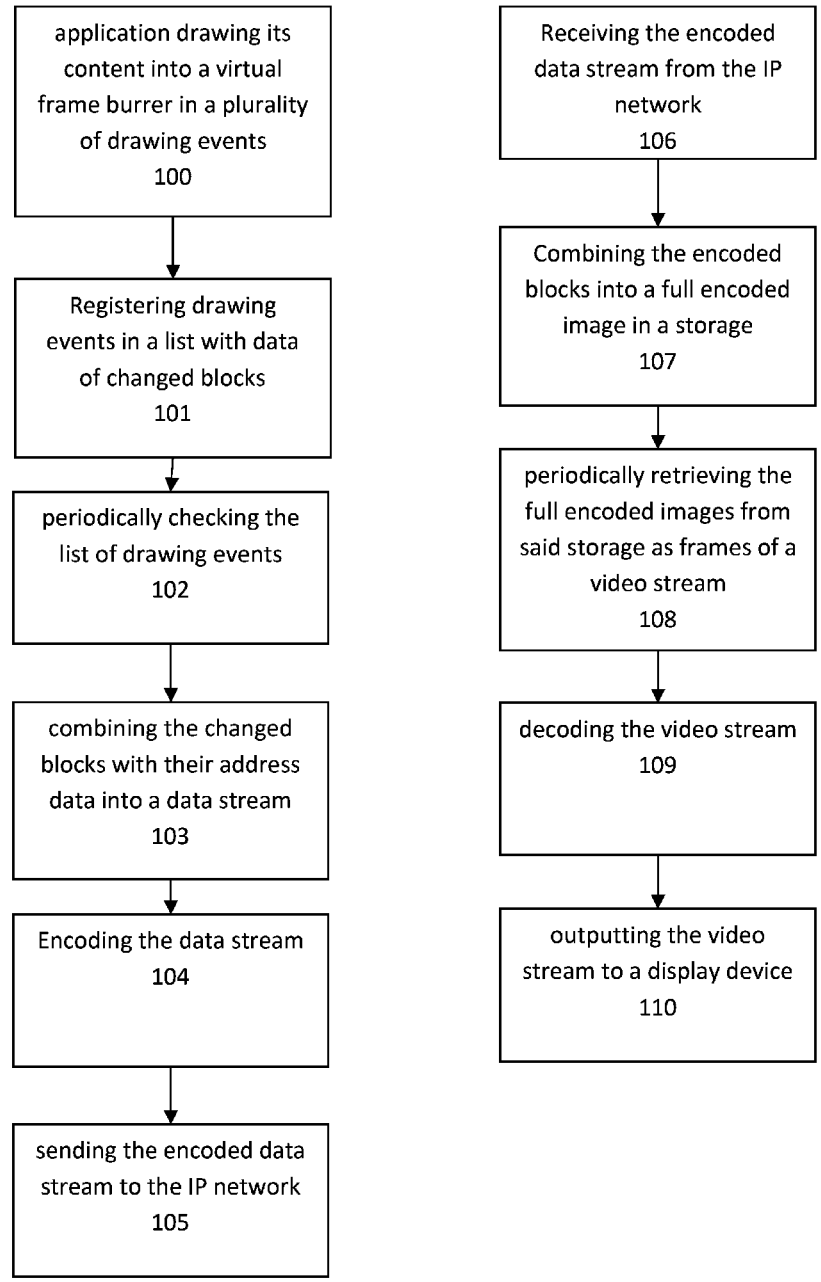
FIG. 3 is a flow diagram showing the steps of the method carried out on the server side according to one embodiment of the invention and FIG. 4 is a flow diagram showing the steps of the method carried out on the client side according to one embodiment of the invention.
Figure 5:
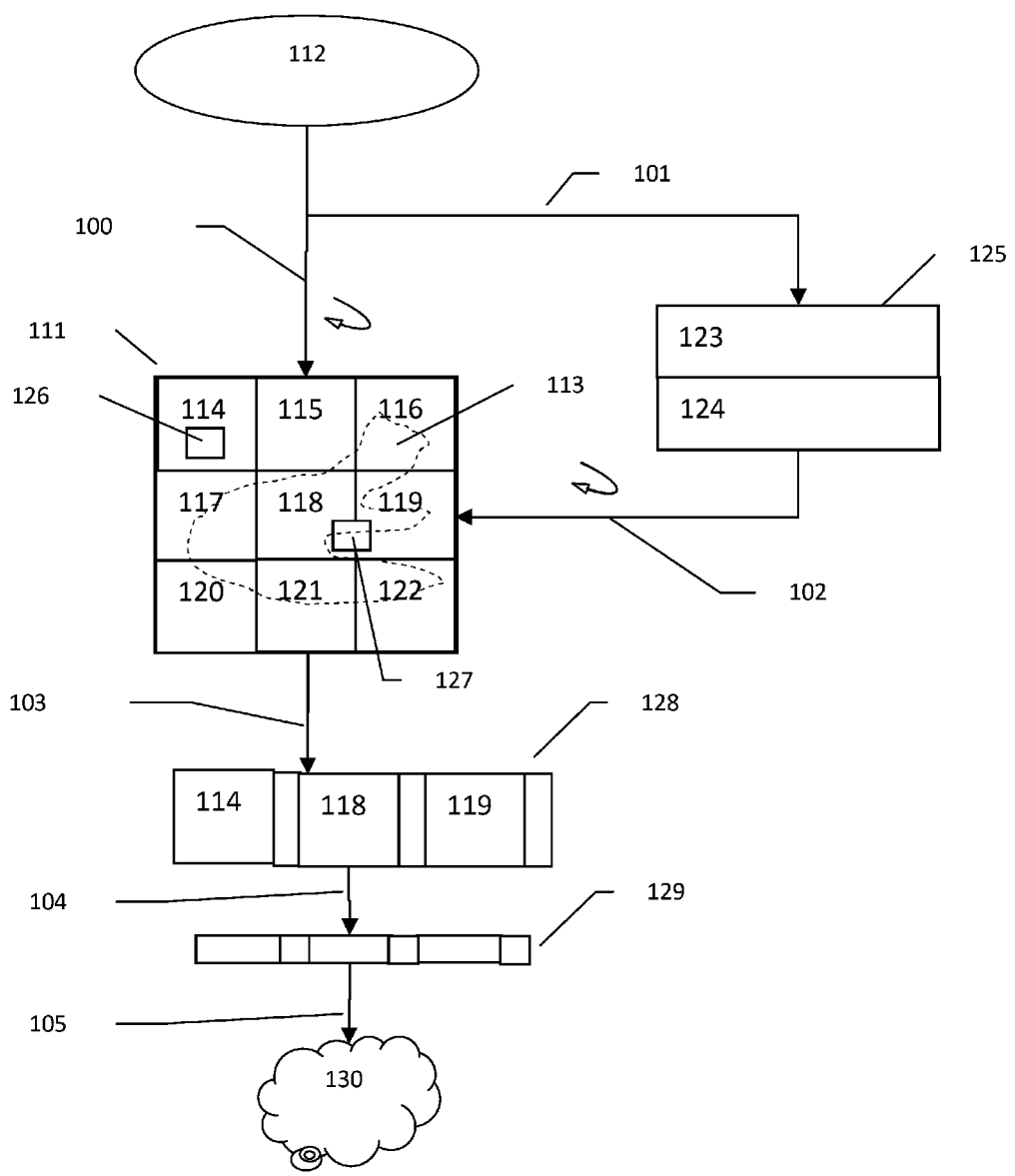
FIG. 5 is a diagram, further explaining the steps of the method as shown on FIG. 3

FIG. 2 describes another background art known from EP2244183 where on server side, not just one frame is stored, but current frame is stored in primary frame buffer and previous frame is held in secondary frame buffer. To reduce the amount of data that is copied from primary frame to a secondary frame, the frame 200 is divided into subblocks 215 et al (e.g., 64 to 64 frame is divided to 64 8 by 8 subblocks) and the status of changed subblocks is kept in the form of table 205. Only the marked subblocks are copied. The method is used to speed up the copying process on the server FIG. 3 is a flow diagram of the steps of the method on the server side according to one embodiment of the invention. FIG. 5 further explains the same method. An application is running on a server and is generating a video output that is intended to be shown to the user as an image on a display device. In step 100 the application is drawing its content into a virtual frame buffer 111 in a plurality of consecutive drawing events 112. The virtual frame buffer thus at each time moment always comprises the freshest image 113 comprising of several blocks 114 to 122. Simultaneously, in step 101, each drawing event (123 and 124) is entered into a list of drawing events 125, where it is associated with identification of a block that was affected by this drawing event. The identification may be coordinates of the block, address of the block, or just a number of the block. All the drawing methods known in the art may be used. Each drawing event may affect one or more blocks as shown by areas 126 and 127 on FIG. 4. As step 102, the list of drawing events is periodically (e.g., at the refresh rate of the typical display device, e.g., from 24 times per second up) checked and if any of the blocks have changed since previous periodic check, such blocks (e.g., blocks 114, 118 and 119) are retrieved from the virtual frame buffer and are, in step 103, combined together with their addresses in a frame, into a data stream 128. Then, in step 104, the data stream is preferably encoded, e.g., spatially compressed, and in step 105, the encoded data stream 129 is sent to the IP network 130. Of course, it is apparent that when the application is first started, all the blocks are new and must be transmitted after first periodic check. Later, however, only changed blocks are transmitted. Depending on the nature of the application, the changes may occur in only few blocks of a large image, or the changes may occur much less frequently compared to the frequency of periodic checks (i.e., the refresh rate).

Figure 6:
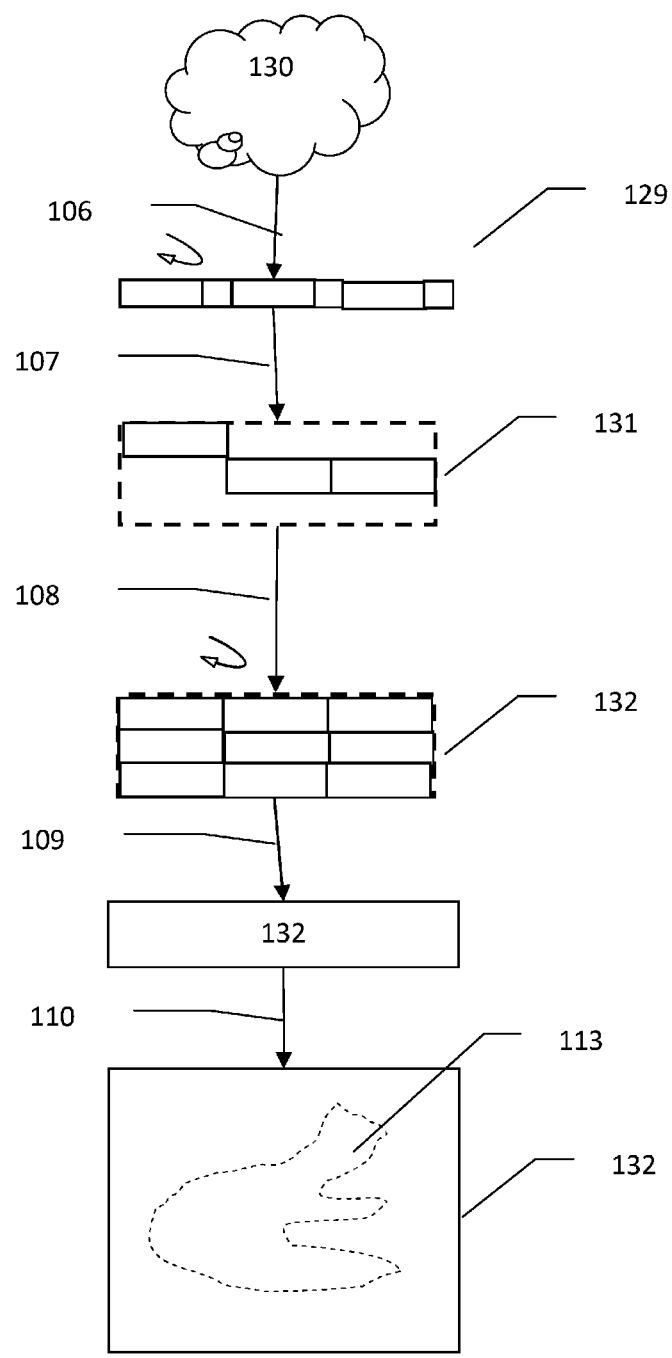
FIG. 6 is a diagram further explaining the steps of the method as shown on FIG. 4.

FIG. 4 is a flow diagram of the steps of the method on the client side. FIG. 6 further explains the method. As step 106, the encoded data stream 129 is received over the IP network 130. In step 107, the received encoded blocks are stored in a storage, e.g., in client device's virtual frame buffer 131. Thus, the buffer always contains all the received encoded blocks needed for composing the freshest full image (frame) to be shown. As step 108, the frame 132 is then periodically (e.g., at the frame rate of the decoder, usually using the same or different frequency as on the server side) read from the storage and combined into an encoded video stream of frames. As step 109, the video stream of frames is then decoded into a decoded video stream 132, using a decoding method supported by the client device. As step 110, the video stream is outputted to a client display device.

While uncompressed blocks may be transmitted in some cases, usually it is preferable that, on the server side, the blocks are spatially compressed, using proprietary or industry standard compressing methods such as Discrete Cosine Transform (DCT) before the blocks are transmitted.

On the client side, the encoded blocks are assembled into encoded frames, the frames are assembled into an encoded stream of frames and then the encoded stream can be decoded. While proprietary coding and decoding can be used, in a preferred embodiment, the encoded blocks are assembled into encoded frames and the encoded frames into the encoded stream of frames so that industry standard decoding method can be used by the client device. In particularly preferred embodiment, a decoding method already supported by the client device is used. For example, if the client device is an IPTV device, such as a settop box (STB), it typically already supports MPEG2 and/or H.264 video decoding. Then, the blocks are assembled so that the frames can be decoded using MPEG2 and/or H.264 video coding.

In client device, the received blocks are stored in a buffer, using the address data. The content of the buffer is periodically retrieved, decoded and outputted to the display of the client device.

Preferably, an industry standard encoding is used so that no or minimum extra processing power is needed on a client device. E.g., if the client device is a STB in an IPTV system, it most likely already includes a MPEG2 (or H.264) decoder. The same applies if the client device is a smartphone, a pocket PC, or other similar device. However, according to MPEG2 and H.264, full frames are transmitted, while according to invented method only changed parts of the frame are transmitted. The solution is that in the client side, a list of current parts of the frame is kept and when new changed parts arrive, they are combined with the parts of the frame already existing on the client device and then the frame is decoded. It is important to understand that no MPEG2 encoding is performed on the server side, but spatial compression, e.g., based on DCT of blocks may be carried out.

The block size is preferably matched to the coding method. E.g., if MPEG2 decoding is used, then it is most advantageous to use so called macroblocks as defined by MPEG2 standard, i.e., blocks of 16 by 16 pixels. Then it is easiest to combine the encoded blocks into a full encoded frame on the client side. Also, then also temporal compression according to MPEG2 standard can be used when subsequent frames are saved (e.g., cached) on a server side prior to coding and sending over the IP network.

The method is particularly useful for IPTV, internet TV and OTT solutions where the operators would like to provide additional services such as video gaming, video calling and video conferencing, video surveillance, video-on-demand (VOD), but the client devices (so called set top boxes, STB) does not have enough processing power and/or other resources to run such additional applications in a client device. On the other hand, many such applications are not adapted to run over a network. According to the invented method, such applications may be run on a server side and only their video output that would be ordinarily sent to the display device, are according to the invention instead sent over an IP network to a client device (STB). Preferably, the server comprises several virtual machines and each application is run on a different virtual machine. Thus, applications for each client are separated, making the system more secure and more reliable (error-proof).

Figure 7:
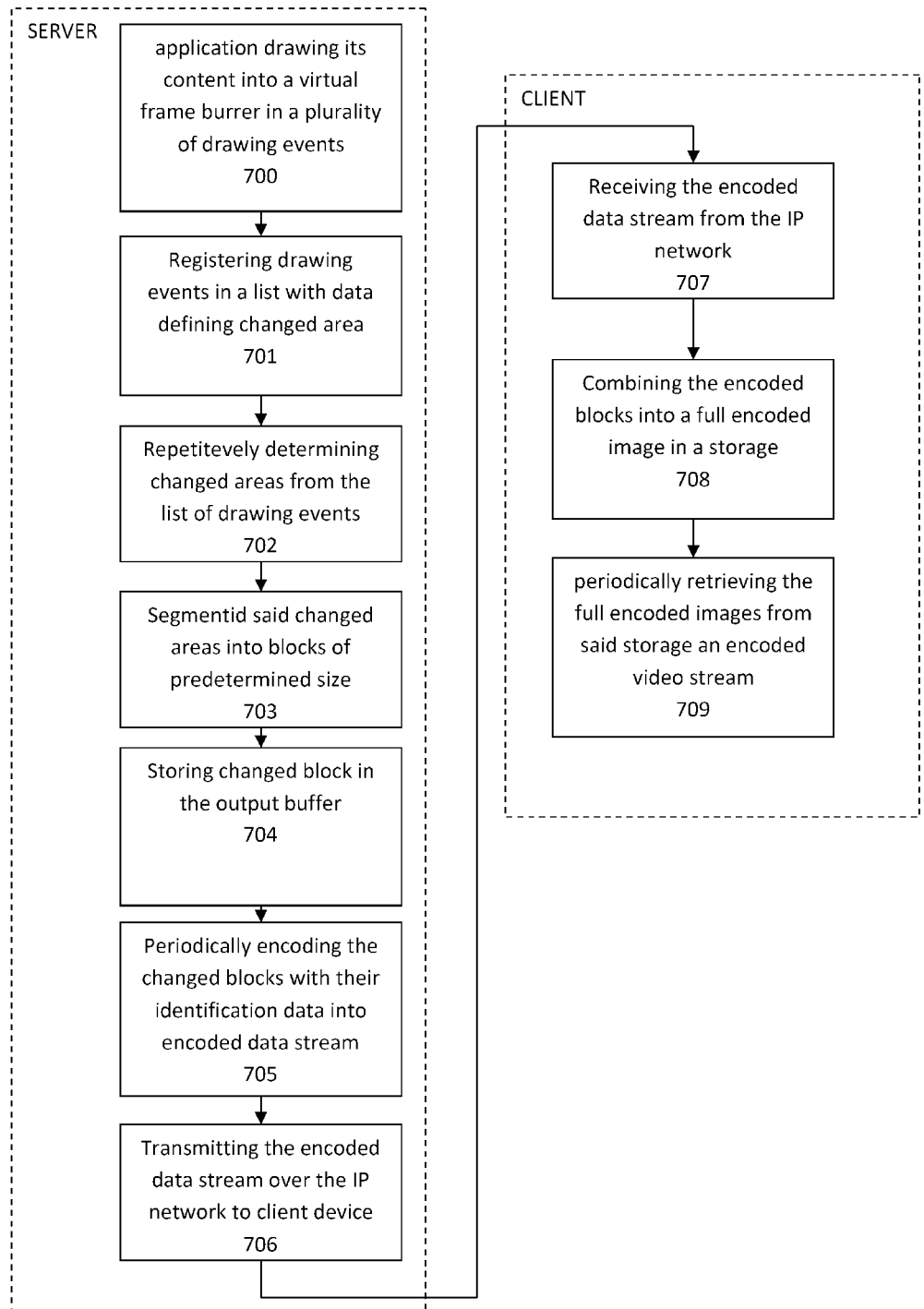
FIG. 7 is a flow diagram of a method according to another embodiment of the invention and FIG. 8 is a diagram further explaining the steps of the method as shown on FIG. 7.
Figure 8:
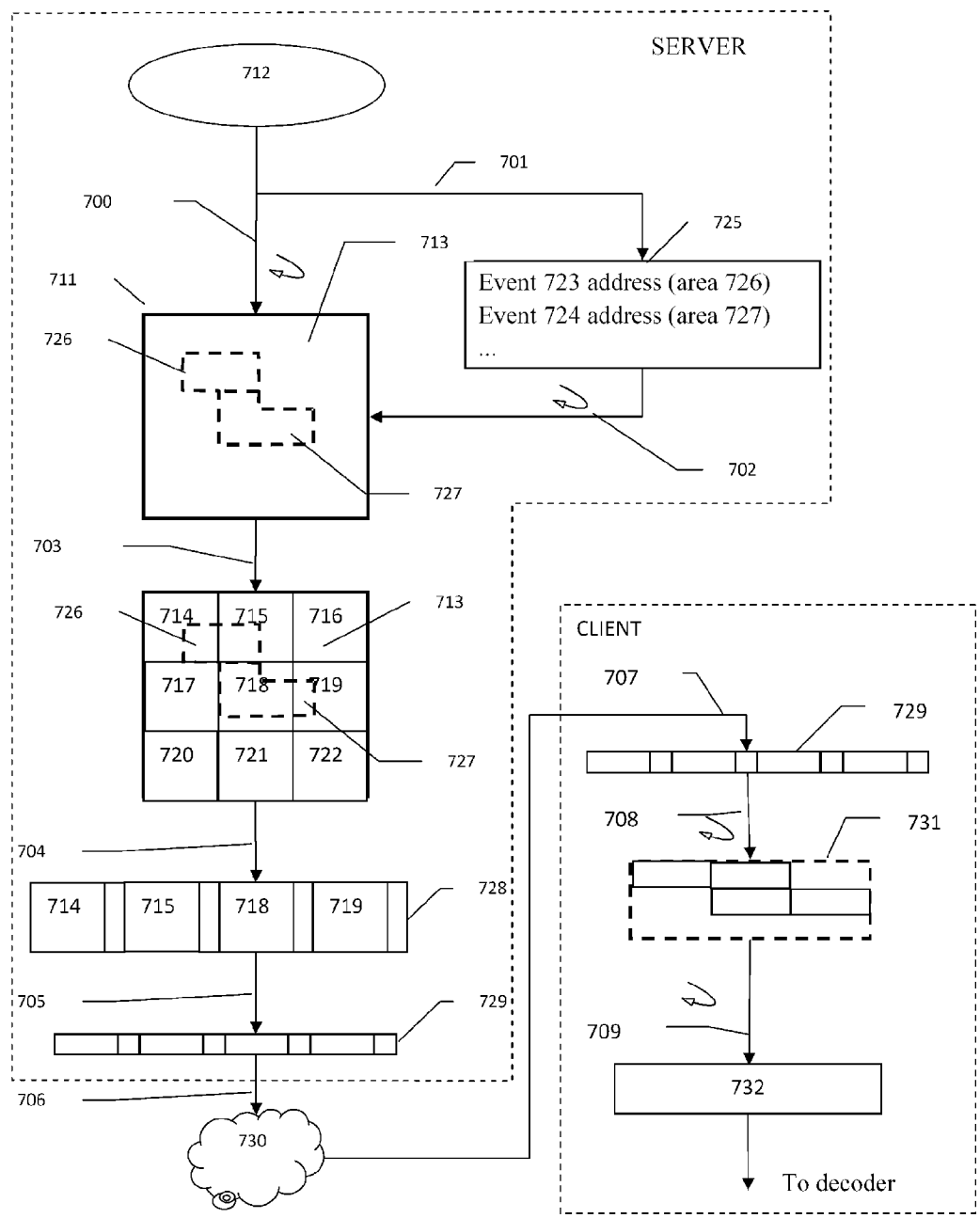

The method according to second embodiment is explained with reference to FIGS. 7 and 8. Similarly to the first embodiment, an application is running on a server and is generating a video output that is intended to be shown (as a series of images, or as a video) on a display device. In step 700 the application is drawing its content into a virtual frame buffer 711 in a plurality of consecutive drawing events 712, each such event affecting an area of the image (shown as 726 and 727 on FIG. 8). The virtual frame buffer thus at each time moment always comprises the freshest image 713 that is intended by the first application to be shown on a display of the client device. Simultaneously, in step 701, each drawing event (shown as 723, affecting area 726, and 724 affecting area 727 on FIG. 8) is entered into a list of drawing events 725, together with data defining the area of the image that was affected (i.e., overdrawn) by corresponding drawing event. The area may be defined, e.g., their address in a virtual frame buffer, or by the corner coordinates of a polygon, which in simplest cases may be a rectangular or a square shaped, or by other means. Then, as step 702, at discrete time intervals, repetitively determining directly from the list of drawing events which areas of the image have been changed by said drawing events since previous determination one discrete time interval earlier, and as step 703, segmenting said changed areas of the image into one or more blocks of pixels, wherein said blocks having predetermined size (e.g., 16 by 16 pixels), and storing (step 704) such predetermined size blocks together with their identification data in an output buffer 728. Then, as step 705, at periodic time intervals, such blocks stored in the output buffer are encoded together with their identification data into a stream of encoded data 729, and such encoded blocks are transmitted in step 706 over the IP network 730 to the client device.

On the client side, the method comprises, as step 707, receiving said encoded blocks with their identification data and storing said encoded blocks in a buffer 731, according to their identification data (step 708). Thus, the buffer always contains all the received encoded blocks needed for composing the freshest full image (frame) to be shown. Then, as step 709, said encoded block are periodically retrieved from said buffer, and assembled into encoded frames of an encoded video stream 732, suitable for being sent to and decoded by a decoder in said client device. Such encoded video stream can be directly fed into a decoder in said client device to be decoded and shown on a display of a client device. The decoder is preferably an industry standard video decoder, capable of decoding video streams in video standard format, such as MPEG2 or H.264 format. Also the block size may be determined by that decoding method. For example, for MPEG2 and H.264 the suitable block is 16 by 16 pixels (so called macroblock). It is important to appreciate, that while standard decoder can be used on the client side without any modifications, the signal on the server side is not coded according to this standard and no such coding device is needed on the server.

The discrete time interval of step 702 on the server side may be constant (e.g., 10 ms, 20 ms, 30 ms, 40 ms, etc), adjustable, e.g., according to the desired length of list of events, or according to the total number or size of areas changed since previous determination, etc., or adjustable according to the periodic time interval for outputting encoded blocks.

The periodic time interval for outputting encoded blocks in the server side may be determined by a nominal frame rate of said decoder in said client device. E.g., for a MPEG2 decoder with nominal frame rate 25 fps, the periodic time interval may be chosen 1 s/25 fps=40 ms. In a more preferred embodiment, said periodic time interval for outputting encoded blocks in the server side is further adjusted by feedback from the client side so that a decoder input buffer that is receiving said encoded video stream, comprises not more than a preset number of frames. Generally, the periodic time interval is chosen so that the periodic checks take place 24 to 60 times per second.

The methods as described may comprise a step of optimization by consolidating the events in the list of events to optimize the process. The step of optimizing the list of drawing events is carried out before retrieving the blocks from the virtual frame buffer according to first example, or before segmenting the areas according to second example. The step of optimizing comprises first removing events that have changed the area of the image, if exactly the same area is also changed by a later event in the list. Secondly, further optimization is accomplished by scanning the list for events that have changed areas that partially overlap, and combining such overlapping areas into a set of non-overlapping, preferably rectangular areas.

The methods as described may further comprise a step of controlling the buffer size on the client device by adjusting the periodic time interval for outputting encoded block in the server (steps 105 and 706 correspondingly). Generally, the periodic time interval for outputting encoded blocks in the server side is fixed, or may be determined by a nominal frame rate of said decoder in said client device. E.g., for a MPEG2 decoder with nominal frame rate 25 fps, the periodic time interval may be chosen 1 s/25 fps=40 ms. However, a preferred embodiment, said periodic time interval for outputting encoded blocks in the server side is further adjusted by feedback from the client side so that a decoder input buffer that is receiving said encoded video stream, comprises not more than a preset number of frames. It is accomplished by slightly increasing the periodic time interval so that the actual outputting rate is, e.g., 24, 9 frames per second for a nominal frame rate of 25 frames. The number of frames thus in the output buffer can be kept, e.g., preferably, from around 2 to 5. This allows quick response time, when user request is received from the client device and the display must be updated as a response to this user request.

The methods as described are suitable for video transmission from a server to a client where client to server video transmission is not required. Such applications include most of the video games, remote desktop applications, but also TV and video streaming. For many applications, such as video calling, video conferencing, some video games and video surveillance applications also video transmission from the client device to the server is required. However, as was the presumption from the beginning, the client device has limited resources. One or the other resource may be more limiting in particular situations. For example, for IPTV devices, generally no extra processing power is available. For mobile devices, for modern devices, the processing power may be less limiting than the power consumption (hence, the battery life) and for slower and/or overloaded networks, the quality of the network connection in terms of both bandwidth and latency may be the biggest issue. A video transmitting device with video encoding (compressing) capabilities is therefore used with client device. The problem now becomes, however, that the application running on the server is typically adapted to work with a camera that is connected to the server, and thus, the first application cannot find nor use instead the camera that is connected to the client device. To solve this problem, the method is further modified by creating a virtual camera device on the server side, intercepting calls (i.e., the requests) by the application to the virtual camera device, transmitting the intercepted calls to the camera connected to the client device, transmitting signals from camera over the IP network to the server where the application can receive the signal from the virtual camera device.

The method may be modified to comprise running a third application on the client device, wherein the third application is adapted to receive a video signal from the camera and to forward the encoded video stream over the IP network to a second application running in the server. The second application is receiving and processing the video stream. The processing may include, e.g., encoding or transcoding, when necessary, thereby feeding the first application with the video stream obtained by the third application from the camera of the client device.

Similarly, when the client device is a mobile device, similar but modified approach may be used to connect with a camera of the mobile device. Similarly, when the first application running on a server is trying to use a camera, it sends calls to a virtual camera device instead of a real device. The calls are intercepted by a second application running on a server wherein the second application generates such responses to the calls as a real video device would have. In a mobile device, a third application is running, wherein the third application is adapted to receive encoded video stream from the camera of the mobile device and to forward the video stream over the IP network to the second application running in the server, wherein the second application is receiving the video stream and is decoding it. Thus, the second application is feeding the first application the video stream obtained by the third application from the camera of the mobile device.

The client device—such as IPTV device, a smart phone, pocket PC, tablet PC, a mobile phone, a PC, or an internet connected TV—is preferably equipped with an input device for receiving control events. The control events are forwarded over the IP network to the first application running on a server, thereby allowing interaction between the client device and the first application. Such input device may be remote control, keyboard, mouse or a touch sensor, etc.

The control events may be also received from a separate (i.e., independent from said client device) control device, connected to said server over an IP network. Such control device could be a smart phone, a mobile phone, pocket PC, tablet PC, a mobile phone, a PC, etc.

Also the video signals may be received from a separate (i.e., independent, i.e., not connected to and not integrated with the client device) web camera, connected to said server over an IP network. The web camera may be adapted to be connected to IP network (an IP camera), or may be connected through an additional IP camera adapter. Also a mobile device such as mobile phone, smart phone, tablet PC, or like with camera, may be used as a separate, independent source of video signals.

In a preferred embodiment, the first application on a server side is run on a virtual machine. Many virtual machines may be created on said server, each virtual machine running an application for its own client.

The invention claimed is:

1. Method for transmitting a video signal over an IP network from a first application running on a server to a client device, said first application generating a video output that is intended to be shown as images on a display device, the method comprising:

said first application drawing its content into a virtual frame buffer on said server, in a plurality of consecutive drawing events, said content representing images to be shown, each such image comprising of a plurality of pixels, the virtual frame buffer thus at each moment of time comprising the freshest image;

entering each drawing event into a list of drawing events together with data defining the image area that was affected by the corresponding drawing event;

repetitively, at discrete time intervals
  1. determining directly from the list of drawing events, which areas of the image have been changed by said drawing events since previous determination one discrete time interval earlier; and
  2. segmenting said changed areas of the image into one or more blocks of pixels, said blocks having predetermined size;

storing such predetermined size blocks together with their identification data in an output buffer; and periodically, at periodic time intervals, encoding said blocks stored in the output buffer together with their identification data and transmitting said encoded blocks over the IP network to the client device.

2. A method according to claim 1, further comprising a step of optimizing the list of drawing events by removing events that have changed the area, if the same area is changed by a later event in the list, and by scanning the list for events that have changed overlapping areas, and combining such overlapping areas into a set of non-overlapping rectangular areas.

3. A method according to claim 1, wherein the lengths of said discrete time intervals are adjusted depending on the frequency of drawing events.

4. A method according to claim 1, comprising on the client device, receiving said encoded blocks with their identification data; storing said encoded blocks, in a buffer according to their identification data; and periodically receiving and assembling said encoded blocks from said buffer, into encoded frames of an encoded video stream, such encoded video stream suitable for being decoded by a decoder in said client device.

5. A method according to claim 4, wherein said periodic time interval for outputting encoded blocks in the server side is determined by a nominal frame rate of said decoder in said client device.

6. A method according to claim 5, wherein said periodic time interval for outputting encoded blocks in the server side is adjusted by feedback from the client side so that a decoder input buffer that is receiving said encoded video stream, comprises not more than a preset number of frames.

7. A method according to claim 4, wherein said encoded video stream is in a standard video standard format.

8. A method according to claim 7, wherein said encoded video stream is in MPEG2 or H.264 format.

9. A method according to claim 4, wherein the block is of the size that is matched to the block size as defined by the decoding method used by the client device.

10. A method according to claim 9, wherein the block size is 16 by 16 pixels.

11. A method according to claim 10, comprising keeping on said server at least two subsequent in time blocks for temporal compressing.

12. A method according to claim 4, wherein the application run on a server side is run in a virtual machine.

13. A method according to claim 12, comprising creating a virtual camera device on the server side, the first application making calls to the virtual camera device, intercepting said calls made by the first application to the virtual camera device, transmitting the intercepted calls over the IP network to a camera that is connected to or integrated with the client device over a computer hardware bus, transmitting a video signal from the camera over the IP network to the server and forwarding said video signal through the virtual camera device to the first application.

14. A method according to claim 13, wherein said camera is a USB device or a camera integrated into a mobile device.

15. A method according to claim 13, wherein the method further comprises running a third application on the client device, wherein the third application is adapted to receive a video signal from the camera and to forward the encoded video stream over the IP network to a second application running in the server, wherein the second application is receiving and processing the video stream, wherein said processing includes encoding and transcoding, when necessary, thereby feeding the first application with the video stream obtained by the third application from the camera of the client device.

16. A method according to claim 4, wherein the client device is equipped with an input device for receiving control events, the method comprises forwarding the control events over the IP network to the first application running on a server, thereby allowing interaction between the client device and the first application.

17. A method according to claim 6, wherein the client device is equipped with an input device for receiving control events to be transmitted to and to control the first application, wherein said preset number of frames is selected low enough so that the changes to the display state caused by the control events will be presented on the display of said client device with short delay.

18. A method according to claim 15, wherein a control device is connected to said server over an IP network, said control device adapted to receive control events from the user and to transmit control events over the IP network to said first application running on a server.

19. A method for transmitting a video signal from an IPTV server over an IP network to an IPTV settop box to be displayed on a display device connected to or integrated with said IPTV settop box, said method comprising:
  a first application run on said IPTV server generating a plurality of consecutive drawing events, each of said consecutive drawing events changing at least one area of a frame stored in a virtual frame buffer on said IPTV server, so that the virtual frame buffer after each of said consecutive drawing events contains the full image to be shown on said display device;
  entering each of said consecutive drawing events into a list of drawing events together with data defining the image area that was affected by said corresponding drawing event;
  repetitively, at discrete time intervals, determining directly from the list of drawing events, which areas of the image have been changed by said drawing events since previous determination one discrete time interval earlier; and segmenting said changed areas of the image into one or more blocks of pixels, said blocks having predetermined size;
  storing such predetermined size blocks together with their identification data in an output buffer; and
  periodically, at periodic time intervals, combining and encoding said blocks stored in the output buffer together with their identification data into a data stream of encoded blocks;
  transmitting said data stream of encoded blocks from said IPTV server over the IP network to said IPTV settop box; and
  on said IPTV settop box, receiving said data stream of encoded, storing each of said encoded block into a third frame buffer according to corresponding identification data of said encoded block so that at each moment of time the third frame buffer contains the full image to be shown on said display device, and
  periodically retrieving said encoded blocks from said third buffer and assembling said encoded blocks into an encoded full image frame of an encoded video stream, such encoded video stream suitable for being decoded by a industry standard video decoder included in said IPTV settop box.

20. A method according to claim 19, wherein said periodic time interval for outputting encoded blocks in said IPTV server is determined by a nominal frame rate of said decoder of said IPTV settop box and adjusted by feedback from the IPTV settop box so that a decoder input buffer that is receiving said encoded video stream, comprises not more than a preset number of frames and wherein said IPTV settop box is equipped with an input device for receiving control events to be transmitted to and to control said first application, wherein said preset number of frames is selected low enough so that the changes to the display state caused by the control events will be presented on the display of said client device without a substantial delay.

\* \* \* \* \*